United States Patent [19]

Frisbee

[11] 4,355,819
[45] Oct. 26, 1982

[54] PASSIVE RESTRAINT SYSTEM

[75] Inventor: Claude M. Frisbee, Bettendorf, Iowa

[73] Assignee: J.I. Case Company, Racine, Wis.

[21] Appl. No.: 217,729

[22] Filed: Dec. 18, 1980

[51] Int. Cl.$^3$ ............................................. B60R 21/10
[52] U.S. Cl. .................................. 280/752; 180/271; 180/326
[58] Field of Search ............... 180/315, 326, 325, 330, 180/331, 286, 271; 280/751, 752, 753, 727, 750, 748

[56] References Cited

U.S. PATENT DOCUMENTS

| | | | |
|---|---|---|---|
| 3,431,995 | 3/1969 | Kiernan | 280/750 X |
| 3,799,572 | 3/1974 | Hollins | 280/752 |
| 3,860,904 | 1/1975 | Andersen | 180/286 X |
| 3,934,898 | 1/1976 | Long | 280/753 |

*Primary Examiner*—Robert J. Spar
*Assistant Examiner*—Donald W. Underwood
*Attorney, Agent, or Firm*—Cullen, Sloman, Cantor, Grauer, Scott & Rutherford

[57] ABSTRACT

A movable control console is provided for a tractor including a passive restraint assembly for automatically securing the operator in his seat during the operation of the machine. The console is selectively movable to a vertical inoperative position where it is out of the way when the operator is getting onto or out of the operator's seat. Further, the console is movable to a generally horizontal operative position where conventional control handles are easily accessible from the operator's seat. The passive restraint assembly is mounted to the movable control console, and it includes a padded restraint arm that is contoured to fit against the operator's waist when he is in the operator's seat and the console is moved to its operation position. A vertically adjustable latch link is pivotally secured to the console for holding the console and padded restraint arm at a selected position for restraining the operator in his seat. A latching mechanism receives the lower depending end of the latch link for locking engagement to maintain the selected position for the console and padded arm. A starter interlock switch is also associated with the latching mechanism to make the tractor engine incapable of starting until the padded restraint arm is locked into position for securing the operator in his seat.

6 Claims, 4 Drawing Figures

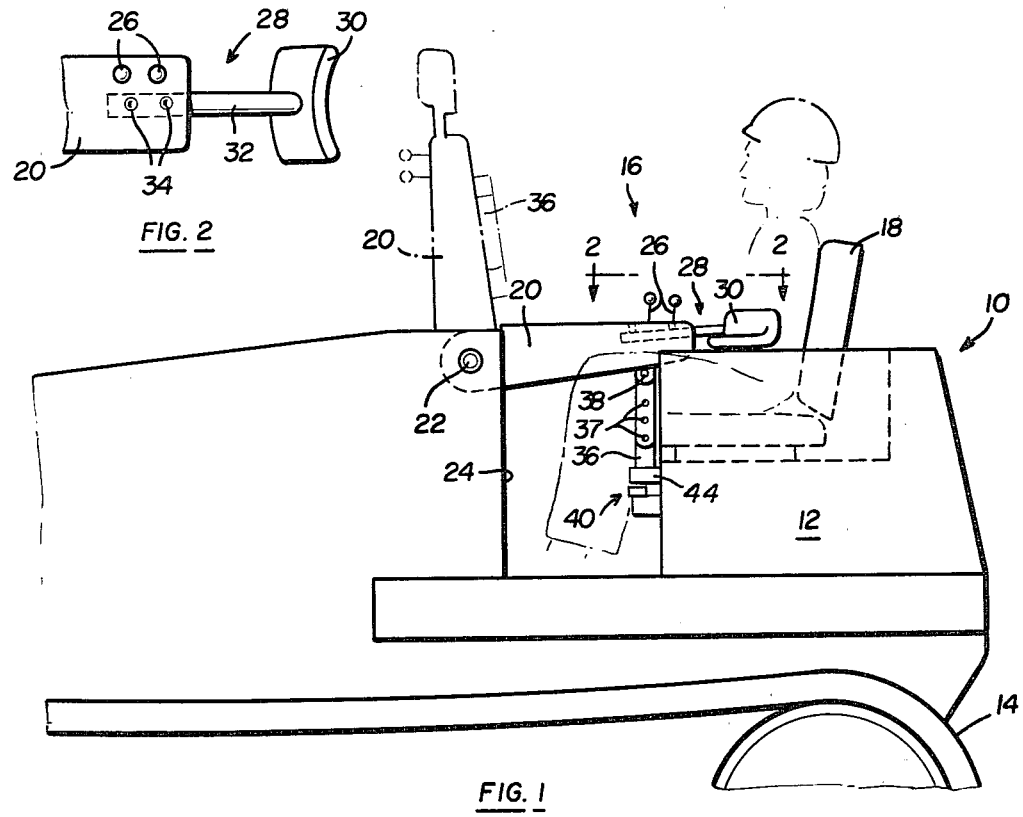
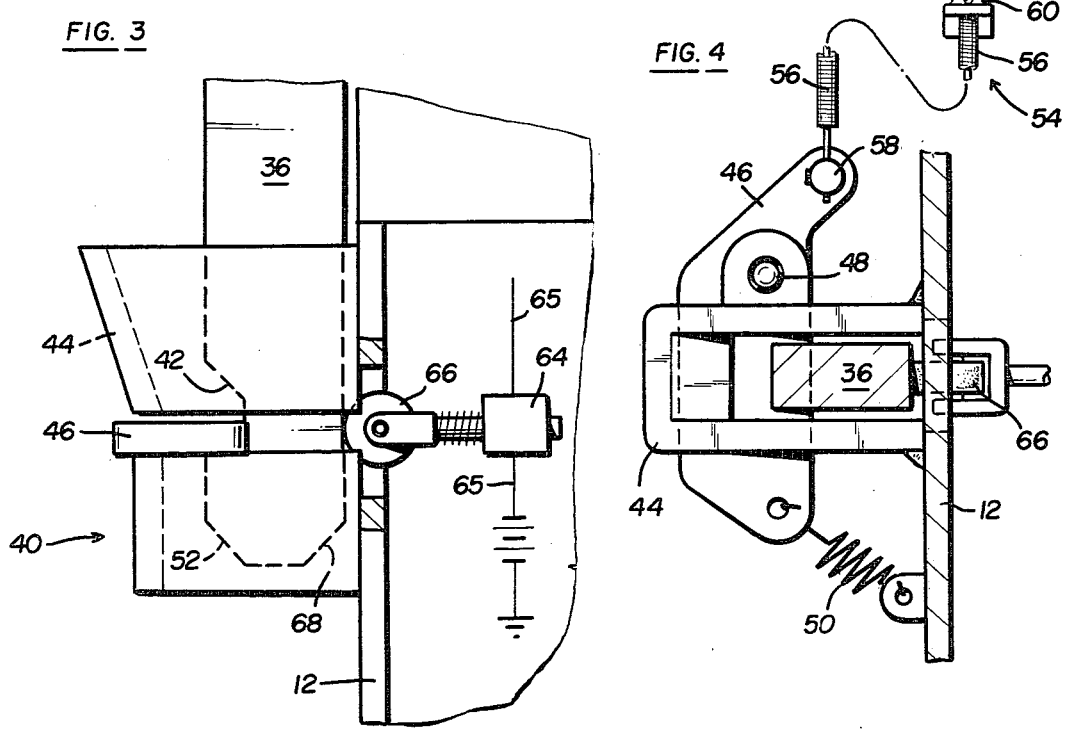

PASSIVE RESTRAINT SYSTEM

BACKGROUND OF THE INVENTION

The present invention relates to a control console for a tractor, and more particularly, to a movable control console including a passive restraint assembly for securing the operator in his seat during the operation of the tractor.

A construction machine such as a tractor includes a number of hand operated and foot operated controls which are required for running the machine. Since it is desirable that adequate space be provided at the operator's station so that the operator can easily move onto and off the operator's seat, a problem arises in arranging the controls to make them accessible to the operator while providing the operator adequate room for movement. Thus, one of the objects of the present invention is to provide adequate space at the operator's station so that the operator can move onto and off of the operator's seat with ease.

It is conventional to provide devices such as seatbelts and the like for securing an operator in his seat during machine operation. It is also desirable that these devices be simple in construction and conveniently located such that the operator will use them when operating the machine. Thus, another object of the present invention is to provide an improved restraint system for securing the operator in his seat during the operation of the machine.

SUMMARY OF THE INVENTION

The present invention includes a control console that is movable to provide adequate space at the operator's station so that the operator can move onto and off of the operator's seat with ease. The control console is movable towards and away from the operator's seat such that the machine controls are readily accessible to the operator when he is seated or movable out of the way to provide maximum space for leaving the tractor.

The control console of the present invention is pivotally attached to the forward end of the operator's compartment. Hand operated transmission control handles are pivotally mounted to the console for actuating the transmission of the tractor for controlling the movement of the machine in a conventional manner. The console is selectively movable to a vertical inoperative position where it is out of the way when the operator is getting onto or out of the operator's seat. Alternatively, the console is movable to a generally horizontal operative position where the control handles are easily accessible from the operator's seat.

Cross reference is made to my copending application Ser. No. 215,462 which shows and describes in further detail other advantages and features of the pivotal control console.

The present invention further includes a passive restraint assembly that is mounted to the pivotal control console for securing the operator in his seat during tractor operation. The restraint assembly includes a generally U-shaped padded arm member that is contoured to fit against the operator's waist when he is in his seat. The padded member is fixed to an arm that is mounted to the console for adjustable horizontal movement to accommodate the particular size of the operator. When the console is moved to its generally horizontal operative position, the padded member is automatically moved against the operator's waist thereby securing the operator in his seat during the operation of the machine.

A vertically adjustable latch link is pivotally secured to the console for holding the console and padded member at a selected position for restraining the operator in his seat. A latching mechanism receives the lower depending end of the latch link for locking engagement to maintain the selected position for the console and padded member.

The latching mechanism is engaged and disengaged by a release mechanism that is mounted adjacent the operator's seat. Thus, the padded restraint arm assembly is adjustable both vertically and horizontally to accommodate various operators, and the assembly is held in a selected position by the latch link and associated latching mechanism such that the operator is properly secured in his seat during machine operation.

A starter interlock switch is also associated with the latching mechanism to make the tractor engine incapable of starting until the padded restraint arm is locked into position for securing the operator in his seat. The switch is closed to permit engine starting only when the latch link is lockingly engaged within the latching mechanism. Thus, the present construction provides a means of insuring that the operator is properly secured within his seat prior to operating the machine.

Other advantages and meritorious features of the control console and passive restraint assembly of the present invention will be more fully understood from the following description of the preferred embodiment, the appended claims, and the drawings, a brief description of which follows.

BRIEF DESCRIPTION OF DRAWINGS

FIG. 1 is a side elevational view of a tractor embodying the movable control console and passive restraint assembly of the present invention.

FIG. 2 is a top plan view of one padded restraint arm taken along line 2—2 in FIG. 1.

FIG. 3 is an enlarged detail side view of the latch link and latching mechanism for locking the padded restraint arm in a selected position during the operation of the machine.

FIG. 4 is a top cross-sectional view further illustrating the latch link and latching mechanism of FIG. 3.

DETAILED DESCRIPTION OF THE INVENTION

A preferred embodiment of a tractor including the control console and passive restraint assembly made in accordance with the teachings of the present invention is illustrated in FIGS. 1-4.

The tractor 10 shown in FIG. 1 is seen to include a main frame 12 flanked by a pair of drive track frames 14. One of the objects of the present invention is to provide adequate space at the operator's station 16 so that the operator can move onto and off of the operator's seat 18 with ease. This object is accomplished by the control console 20 of the present invention that is movable towards and away from the operator's seat 18 such that the machine controls are readily accessible to the operator when he is seated or movable out of the way to provide maximum space for leaving the tractor.

The movable control console 20 is pivotally attached by pin 22 to the forward end 24 of the operator's compartment 16. Hand operated transmission control handles 26 are pivotally mounted to console 20 for actuating the transmission of the tractor 10 thereby controlling movement of the machine in a conventional manner. Console 20 is selectively movable to a vertical inoperative position (phantom line position of FIG. 1) where it is out of the way when the operator is getting onto or out of the operator's seat 18. Alternatively, console 20 is movable to a generally horizontal operative position (solid line position of FIG. 1) where control handles 26 are easily accessible from the operator's seat.

A passive restraint assembly 28 is mounted to the pivotal control console 20 for securing the operator in his seat during tractor operation. The restraint assembly includes a generally U-shaped padded arm member 30 that is contoured to fit against the operator's waist when he is in operator's seat 18. Padded member 30 is fixed to an arm 32 that is mounted to console 20 by set screws 34 for adjustable horizontal movement to accommodate the particular size of the operator. When console 20 is moved to its generally horizontal operative position, as illustrated in FIG. 1, padded member 30 is automatically moved against the operator's waist thereby securing the operator in his seat during the operation of the machine.

A vertically adjustable latch link 36, including vertical adjustment points 37, is pivotally secured to console 20 by pin 38 for holding the console and padded member 30 at a selected position for restraining the operator in seat 18. A latching mechanism 40 receives the lower notched end 42 of latch link 36 (FIG. 3) for locking engagement to maintain the selected position for console 20 and padded member 30.

Latching mechanism 40 includes a housing 44 to which a latch plate 46 is pivotally attached by pin 48. Latch plate 46 is normally biased into locking engagement with the notched portion 42 of latch link 36 by spring 50 which is interconnected between plate 46 and frame 12. When latch link 36 is pushed downwardly into housing 44 for locking engagement with latch plate 46, the tapered side 52 of latch link 36 forces plate 46 outwardly until it snaps into engagement with notched portion 42 thereby locking console 20 and restraint assembly 28 in position.

A release mechanism 54 comprising a push-pull cable assembly 56 is connected at one end 58 to latch plate 46, and its other end 60 is mounted adjacent operator's seat 18. The operator pushes on handle 62 to pivot latch plate 46 about pivot pin 48 to thereby release latch link 36 from latching mechanism 40. Thus, the padded restraint arm assembly 28 is adjustable both vertically and horizontally to accommodate various operators, and it is held at a selected position by the latch link 36 and associated latching mechanism 40 such that the operator is properly secured in his seat during machine operation.

A starter interlock switch 64 is also associated with latching mechanism 40 to make the tractor engine incapable of starting until the padded restraint arm assembly 28 is locked into position for securing the operator in seat 18. Switch 64 is connected by leads 65 to the conventional starting circuit for the machine and is closed in response to the depression of spring biased roller plunger 66 to thereby permit engine starting. Roller plunger 66 is depressed by the tapered side 68 of latch link 36 when latch link 36 is lockingly engaged within latching mechanism 40. Thus, the present construction provides a means of insuring that the operator is properly secured within his seat before the machine may be operated.

It will be apparent to those skilled in the art that the foregoing disclosure is exemplary in nature rather than limiting, the invention being limited only by the appended claims.

I claim:

1. A passive restraint system for a tractor having a frame and an operator's seat mounted on said frame, said restraint system including:
    a restraint arm having a padded end portion that is contoured to fit against the operator when he is in the operator's seat, said restraint arm connected to mounting means for adjustable movement to accommodate the particular size of the operator, said restraint arm and mounting means being pivotally connected to said frame;
    said restraint arm being movable to a generally vertical position where it is out of the way when the operator is getting onto or out of the operator's seat and said restraint arm being movable to a generally horizontal position for engaging the operator to thereby secure him in the operator's seat;
    securing means for locking said restraint arm at a selected position for restraining the operator in the operator's seat, said securing means including an adjustable latch link pivotally connected to said mounting means and a latching mechanism mounted to said frame receiving said latch link for locking engagement to maintain the selected position for said restraint arm; and
    means for making said tractor inoperable until the restraint arm is locked into position for securing the operator in the operator's seat.

2. The passive restraint system as defined in claim 1 wherein said latching mechanism includes a housing to which a latch plate is pivotally connected, means for normally biasing said latch plate into locking engagement with a notched portion in said latch link, and a release mechanism for pivoting said latch plate to release said latch link from said latching mechanism.

3. The passive restraint system as defined in claim 2 wherein said means for making said tractor inoperable includes a starter interock switch mounted to said frame adjacent said latching mechanism, means for actuating said switch in response to locking engagement between said latch link and said latching mechanism whereby the tractor is incapable of starting until the restraint arm is locked into position for securing the operator in the operator's seat.

4. In a tractor having a frame, an engine and operator's station mounted on said frame, and said operator's station including an operator's seat, the improvement comprising:
    a control console pivotally connected to the forward end of said operator's station, control handles connected to said console for controlling movement of the tractor, said console being movable to a generally vertical inoperative position where it is out of the way when the operator is getting onto or out of the operator's seat and said console being movable to a generally horizontal operative position where the control handles are easily accessible from the operator's seat;
    a passive restraint assembly mounted to said control console for securing the operator in the operator's seat during operation of the tractor, said restraint assembly including a restraint arm that is contoured to fit against the operator when he is in the operator's seat, said arm being mounted to said console for adjustable movement to accommodate the particular size of the operator, and said restraint arm being automatically movable against the operator to thereby secure him in the operator's seat in response to movement of said control console ot its generally horizontal operative position;

securing means for locking said control console and restraint assembly at a selected position for restraining the operator in the operator's seat, said securing means including an adjustable latch link pivotally connected to said control console and a latching mechanism mounted to said frame receiving said latch link for locking engagement to maintain the selected position for said console and restraint assembly.

5. The tractor as defined in claim 4 wherein said latching mechanism includes a housing to which a latch plate is pivotally connected, means for normally biasing said latch plate into locking engagement with a notched portion in said latch link, and a release mechanism for pivoting said latch plate to release said latch link from said latching mechanism.

6. The tractor as defined in claim 4 including a starter interlock switch mounted to said frame adjacent said latching mechanism, means for actuating said switch in response to locking engagement between said latch link and said latching mechanism whereby the tractor engine is made inoperable until the restraint assembly is locked into position for securing the operator in the operator's seat.

* * * * *